(12) United States Patent
Poulin et al.

(10) Patent No.: US 6,663,530 B2
(45) Date of Patent: *Dec. 16, 2003

(54) ZERO TWIST CARRIER

(75) Inventors: Martin Poulin, Mont Saint-Hilaire (CA); Alain Lewis, Brossard (CA); Robert Gautier, Longueuil (CA)

(73) Assignee: Pratt & Whitney Canada Corp., Longueuil (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 10/017,152

(22) Filed: Dec. 14, 2001

(65) Prior Publication Data

US 2003/0114267 A1 Jun. 19, 2003

(51) Int. Cl.[7] .............................................. F16H 57/08
(52) U.S. Cl. ..................................................... 475/331
(58) Field of Search ............................... 475/331, 334, 475/346, 901

(56) References Cited

U.S. PATENT DOCUMENTS

| | | | |
|---|---|---|---|
| 3,527,121 A | * | 9/1970 | Moore ..................... 475/331 X |
| 3,842,481 A | * | 10/1974 | Laing .......................... 29/434 |
| 3,939,736 A | * | 2/1976 | Morin ..................... 475/331 X |
| 4,129,050 A | * | 12/1978 | Akashi et al. .......... 475/331 X |
| 4,282,776 A | | 8/1981 | Eller |
| 4,329,130 A | | 5/1982 | Nagata et al. |
| 4,586,401 A | | 5/1986 | Nogle |
| 4,793,214 A | * | 12/1988 | Nurnberger et al. ........ 475/331 |
| 4,983,152 A | * | 1/1991 | Kimberlin et al. .......... 475/331 |
| 5,136,197 A | | 8/1992 | Hallett |
| 5,152,726 A | | 10/1992 | Lederman |
| 5,237,885 A | | 8/1993 | Putney et al. |
| 5,309,714 A | | 5/1994 | Putney et al. |
| 5,382,203 A | * | 1/1995 | Bellman et al. ............. 475/331 |
| 5,466,198 A | | 11/1995 | McKibbin et al. |
| 5,470,286 A | * | 11/1995 | Fan ............................ 475/331 |
| 5,649,254 A | * | 7/1997 | Mori et al. ................. 396/411 |
| 5,679,089 A | | 10/1997 | Levedahl |
| 6,148,605 A | | 11/2000 | Lardellier |
| 6,422,971 B1 | * | 7/2002 | Katou et al. ................ 475/331 |

FOREIGN PATENT DOCUMENTS

| | | | | |
|---|---|---|---|---|
| EP | 271416 | * | 6/1988 | ................. 475/331 |
| EP | 0 618 383 A1 | | 10/1994 | |
| EP | 0 989 316 A1 | | 3/2000 | |
| GB | 725364 | | 3/1955 | |
| GB | 1 420 965 | | 1/1976 | |
| JP | 358061982 | * | 4/1983 | |
| JP | 358156773 | * | 9/1983 | ................. 475/331 |
| JP | 407332475 | * | 12/1995 | |
| JP | 408270739 | * | 10/1996 | |

* cited by examiner

Primary Examiner—Ha Ho
(74) Attorney, Agent, or Firm—Ogilvy Renault

(57) ABSTRACT

A torque transfer assembly adapted for use in a planetary gear train is provided. The torque transfer assembly comprises generally a planetary carrier and a torque transfer coupling adapter. The planetary carrier is adapted to rotatably support the plurality of planet gears between a first and second planes. The planetary carrier also has a first connecting member extending therefrom. The torque transfer coupling adapter is disposed concentrically and rotatably with the planetary carrier, and has a central torque output element and a second connecting member extending from it. The second connecting member is adapted to be engaged with the first connecting member to structurally join the coupling adapter and the planetary carrier, the first and second connecting members being structurally joined together between the first and second planes.

14 Claims, 6 Drawing Sheets

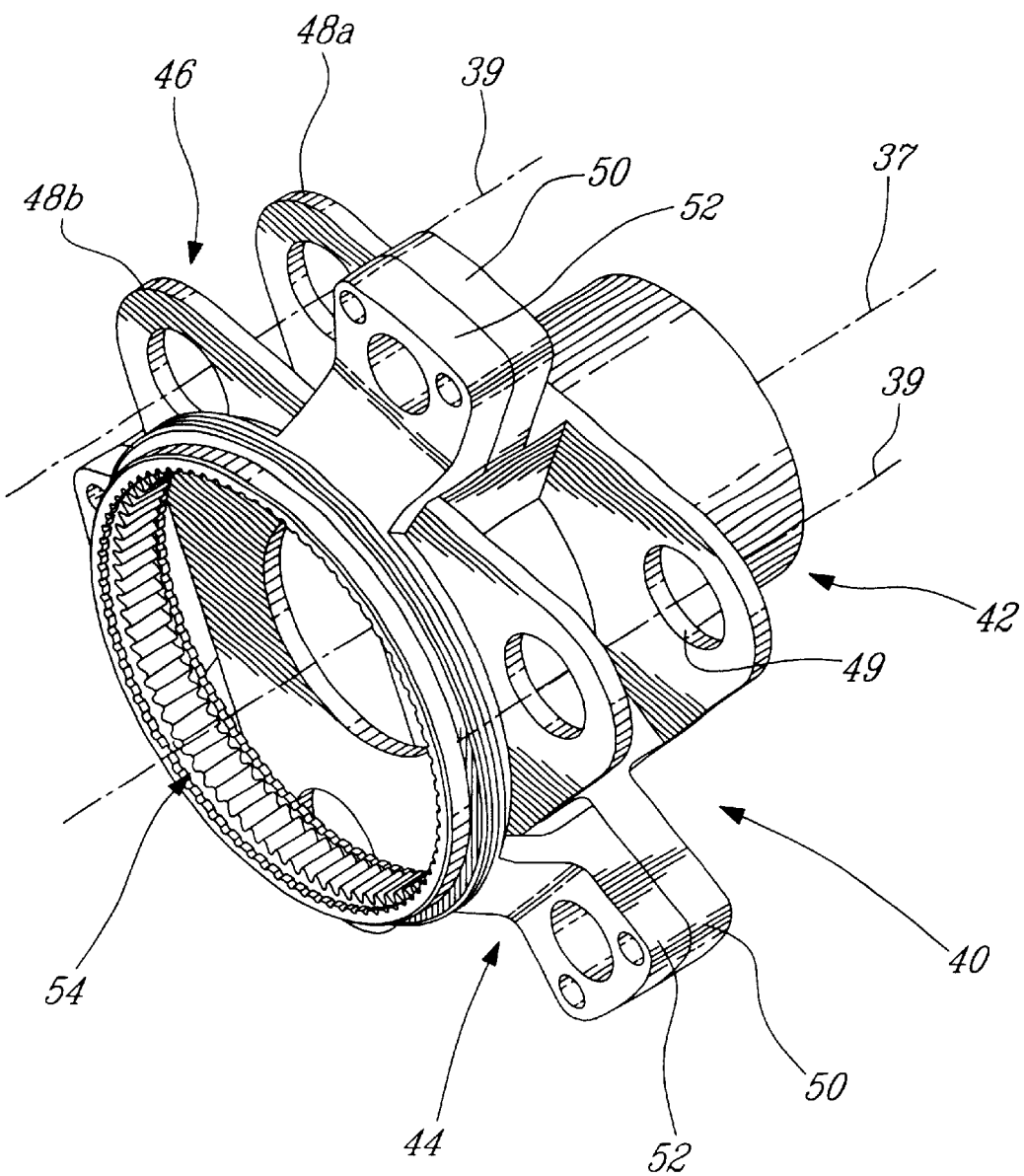
FIG_3

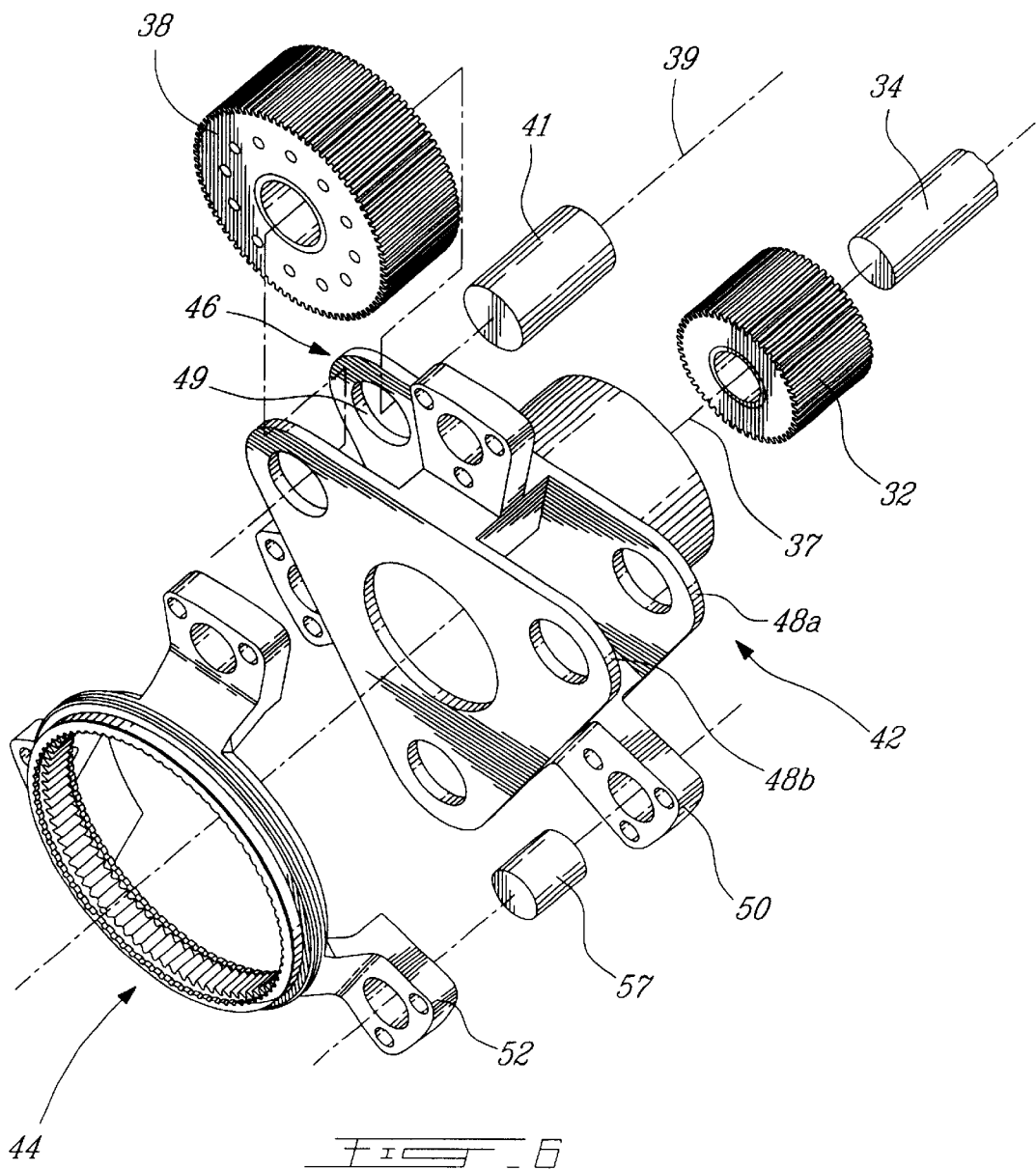

ZERO TWIST CARRIER

TECHNICAL FIELD

The present invention relates to epicyclic gearboxes, and more particularly, to a planet gear carrier in an epicyclic gearbox.

BACKGROUND OF THE INVENTION

Epicyclic or planetary gearboxes are frequently used in gas turbine engines for their compact designs and efficient high gear reduction capabilities. Planetary gear trains are well known, and are generally comprised of three gear train elements: a central sun gear, an outer ring gear with internal gear teeth, and a plurality of planet gears supported by a planet carrier between and in meshing engagement with both the sun gear and the ring gear. All three gear train elements share a common longitudinal central axis, about which at least two of them rotate. An advantage of planetary gear trains is their versatility. A rotary input can be connected to any one of the three elements. Holding one of the remaining two elements stationary with respect to the other two, permits the third to serve as an output.

In gas turbine engine applications, where a speed reduction transmission is required, the central sun gear generally provides rotary input from the powerplant, and the outer ring gear is held stationary. The planet gear carrier therefore provides torque output at a reduced rotational speed.

However, certain shortcomings do exist with planetary drive trains. For example, as with many mechanical elements that transfer torque, a small but nevertheless significant amount of torsional deflection commonly occurs due to the elasticity of the material of the carrier, as a result of twist between upstream and downstream plates of the planetary gear carrier, when the gear train is under load. The plates of the planet gear carrier twist relative to one another around the central axis, causing the axles of the planet gears to lose parallelism with the central axis of the planetary carrier. This torsional deflection results in misalignment at gear train journal bearings and at the gear teeth mesh point, which leads to efficiency losses and reduced life of the parts. Additionally, increased oil flow is required to the journal bearings to compensate for the misalignments caused by torsional deflections of the planet carrier plates.

Attempts to address this problem of planetary carrier torsional deflection are known. U. S. Pat. No. 5,466,198 issued Nov. 14, 1995 to McKibbin et al., for example, clearly sets out the problem and proposes a planetary gear train drive system which isolates the planetary carrier from torsional deflections. A torque frame or torque transfer structure is connected to a rotating load, such as a bladed propulsor. Pivotal joints, circumferentially disposed with respect to the carrier, each pivotable about a radial axis, connect axially extending arms of a torque frame to the planetary carrier. The pivotal joints, which are vital to the invention of McKibbin et al., permit the planetary carrier to be isolated from torsional deflections. While McKibbin et al. do provide a device that eliminates planetary carrier torsional deflections, the planetary carrier system disclosed is of significant complexity. Both a low number of parts and low weight are characteristics vital in aircraft applications. Also, added parts, especially involving pivotable joints, increases the possibility of reliability problems.

Therefore, there remains a need for a simple, compact, device capable of transferring torque while eliminating twist within a planetary carrier.

SUMMARY OF THE INVENTION

It is an object of the present invention to provide an improved planetary gear train.

It is an object of the present invention to provide a torque transfer device for use in a planetary gear train.

It is another object of the present invention to provide a planetary carrier capable of torque transfer with minimal twist occurring between the upstream and downstream plates of a planetary carrier.

Therefore, in accordance with the present invention, there is provided a torque transfer assembly adapted for use in a planetary gear train, the gear train including a sun gear rotatable about an axially extending central axis, a concentric stationary outer ring gear, and a plurality of planet gears mechanically intermediate said sun gear and said ring gear and in meshing engagement therewith, the plurality of planet gears adapted for receiving torque input from the sun gear, said torque transfer assembly comprising: a planetary carrier, rotatable about said axially extending central axis and adapted to rotatably support said plurality of planet gears on a plurality of axles between first and second axle ends, said first and second axle ends defining first and second planes respectively, said plurality of axles being parallel to the central axis and the first and second planes being perpendicular to the central axis, the planet gears being circumferentially located on the planetary carrier about the central axis, the carrier having a first connecting member extending therefrom; and a torque transfer coupling adapter, disposed concentrically with said planetary carrier and rotatable therewith, said torque transfer coupling adapter having a central torque output element and a second connecting member extending therefrom, said second connecting member adapted to be engaged with said first connecting member to structurally join the coupling adapter and the planetary carrier, said first and second connecting members being structurally joined together between said first and second planes.

BRIEF DESCRIPTION OF THE DRAWINGS

Further features and advantages of the present invention will become apparent from the following detailed description, taken in combination with the appended drawings, in which:

FIG. 3 shows a perspective view of the torque transfer device according to the present invention.

FIG. 4b shows a front elevation view of the planetary carrier of FIG. 4a.

FIG. 6 shows a perspective exploded view of the torque transfer assembly of the present invention.

DETAILED DESCRIPTION OF THE PREFERRED EMBODIMENT

Figure 1:
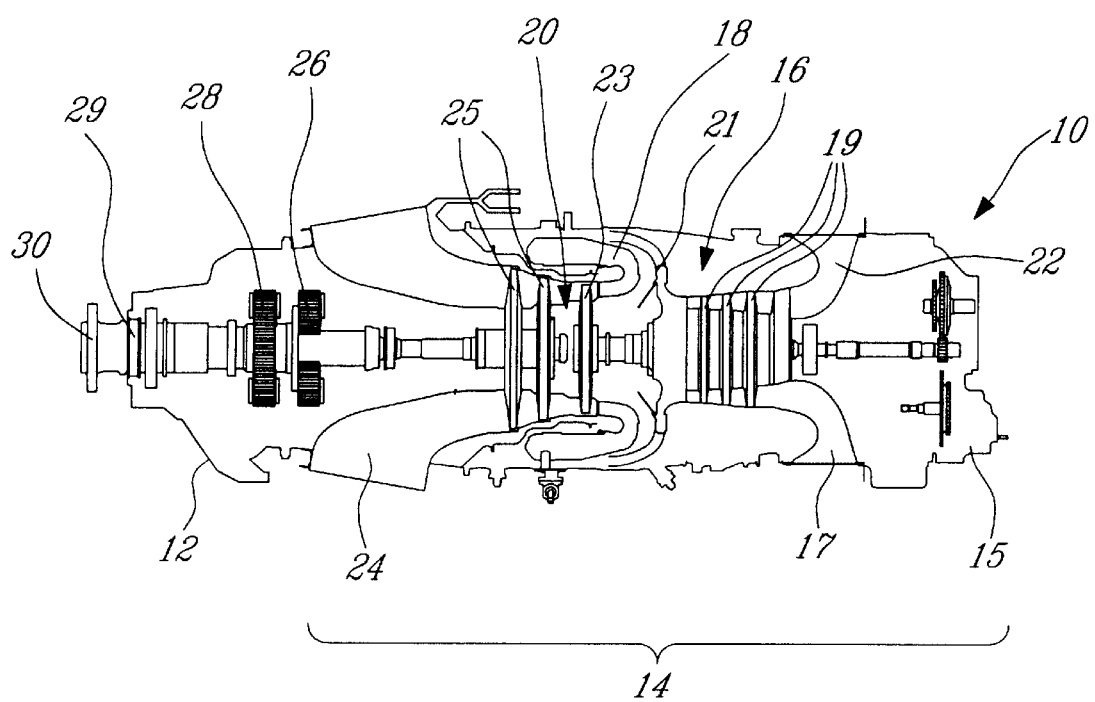
FIG. 1 shows a schematic view of a gas turbine engine having a multi-stage planetary gearbox incorporating the present invention.

Referring to FIG. 1, a turboprop gas turbine engine 10 generally having a power plant 14 and a reduction gearbox 12. The engine power plant 14 includes a compressor section 16, combustion chamber 18, and a turbine section 20. Air inlets 22 permit air to be drawn into the gas generator and, following power withdrawal by the turbine section, exhaust ducts 24 provide an engine exhaust gas outlet.

The operation of such a gas turbine engine is well known, and occurs generally as follows by means of example only. Air enters the engine through the inlet 17 and is compressed by the compressor section 16, in this case comprising axial flow compressors 19 and a centrifugal compressor 21. The compressed air is then fed to the combustion chamber 18 where it is mixed with fuel and ignited. The hot gas then expands through the turbine section 20, comprised of a compressor turbine 23 which drives the compressor 18 and the accessories through accessory gearbox 15, and the power turbine section 25, which is mechanically independent from the compressor turbine 23, drives the propeller shaft 29 by means of the planetary reduction gearbox 12. Planetary or epicyclic gearboxes are well known in turboprop applications, and generally comprise a sun gear, a ring gear, and at least two planet gears supported by a planetary carrier, all of which are described in further detail below. The hot gas is then discharged to the atmosphere through exhaust ducts 24.

In the exemplary embodiment, the planetary reduction gearbox 12 includes a first reduction stage 26 and a second reduction stage 28 which drive a propeller (not shown), fastened to propeller flange 30, through propeller shaft 29.

Figure 2:
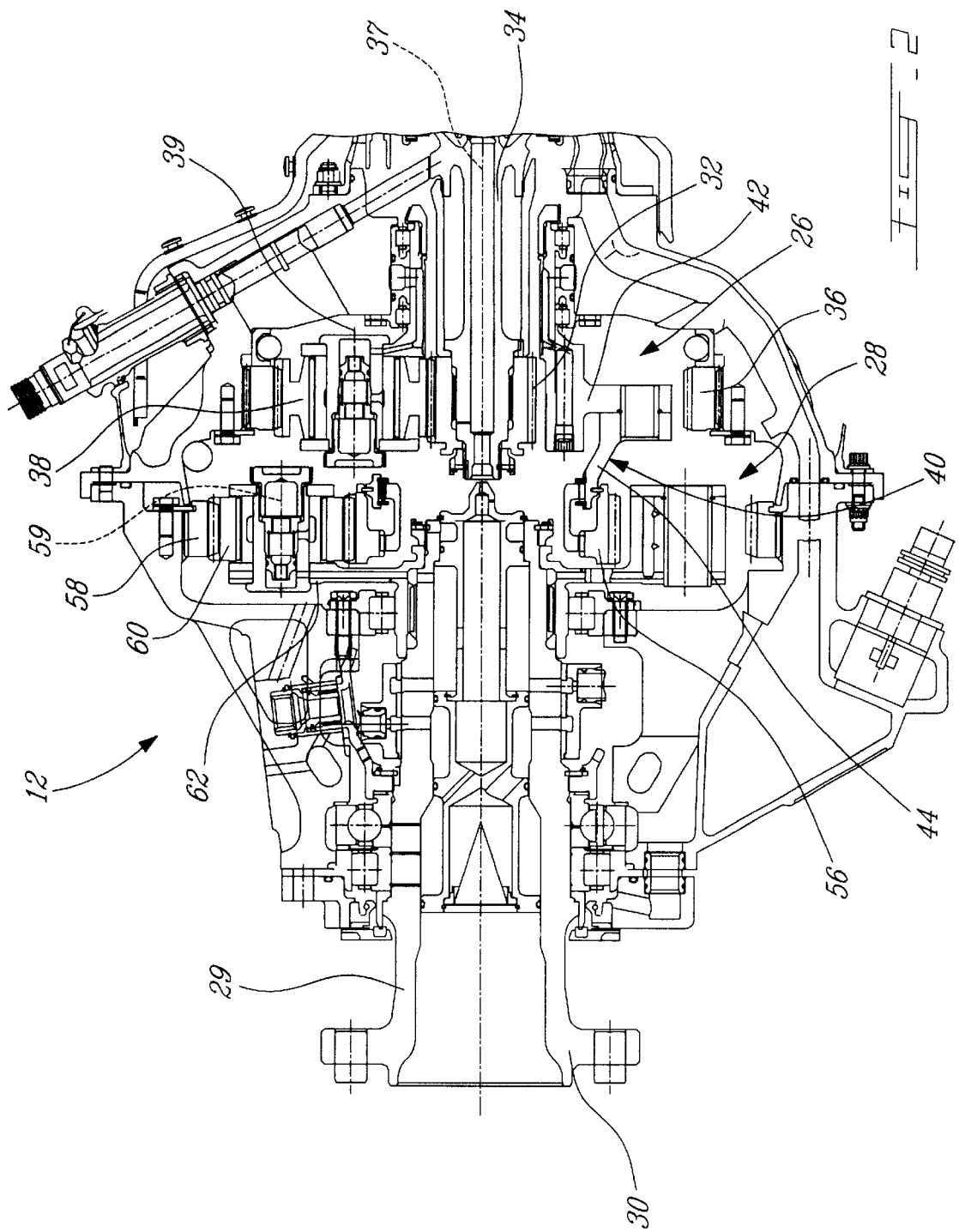
FIG. 2 shows a cross sectional detail view of the planetary gearbox in FIG. 1.
Figure 4A:
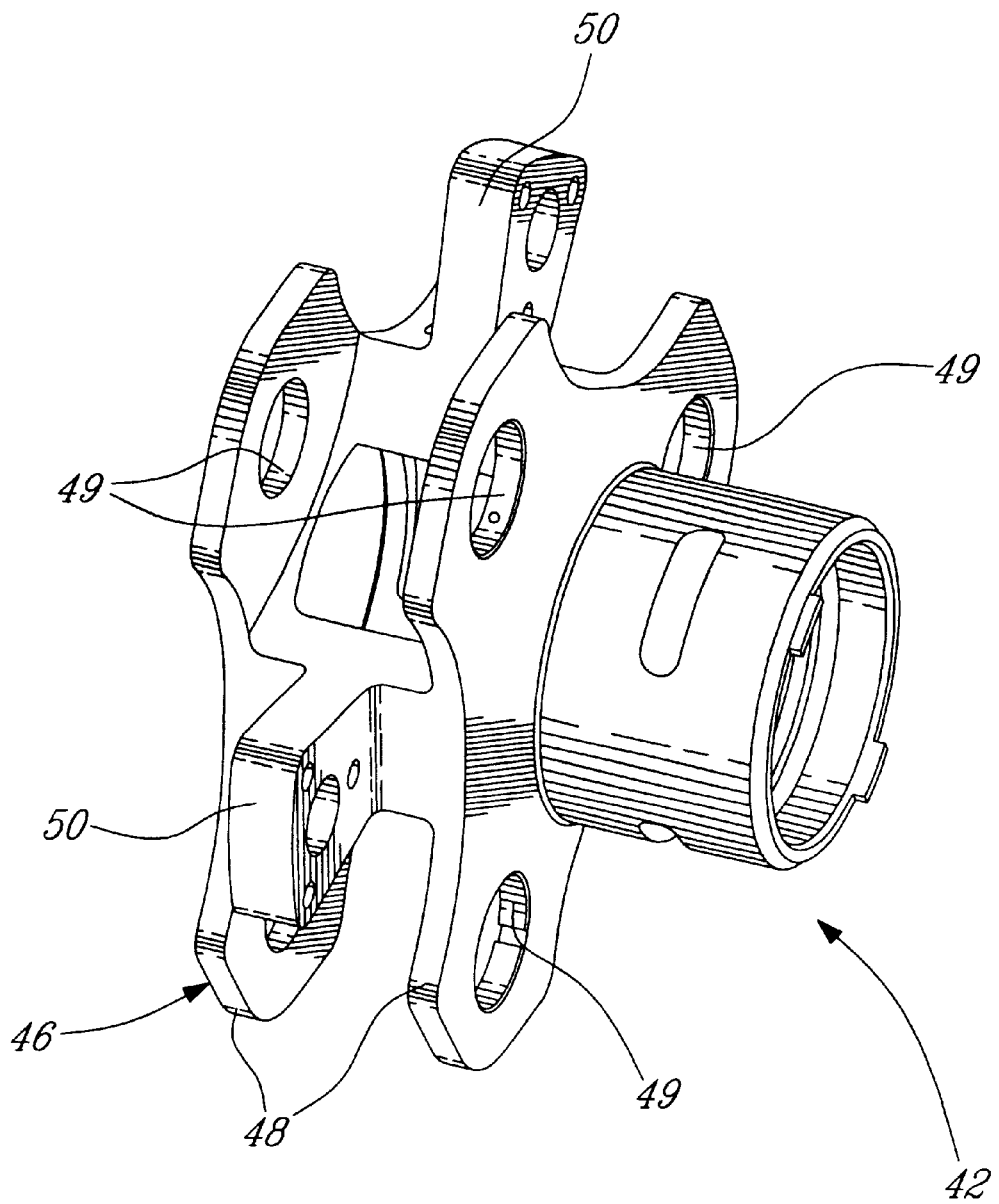
FIG. 4a shows a perspective view of a planetary carrier in accordance with an alternate embodiment of the present invention.
Figure 4B:
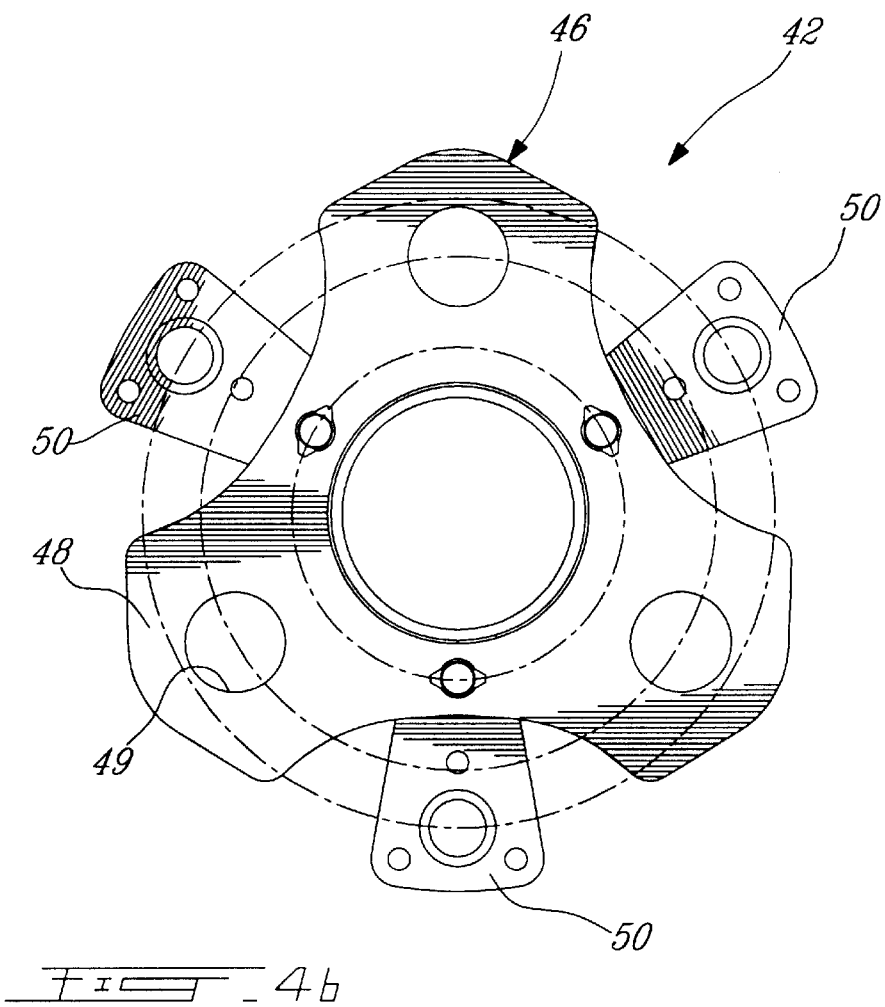
Figure 5:
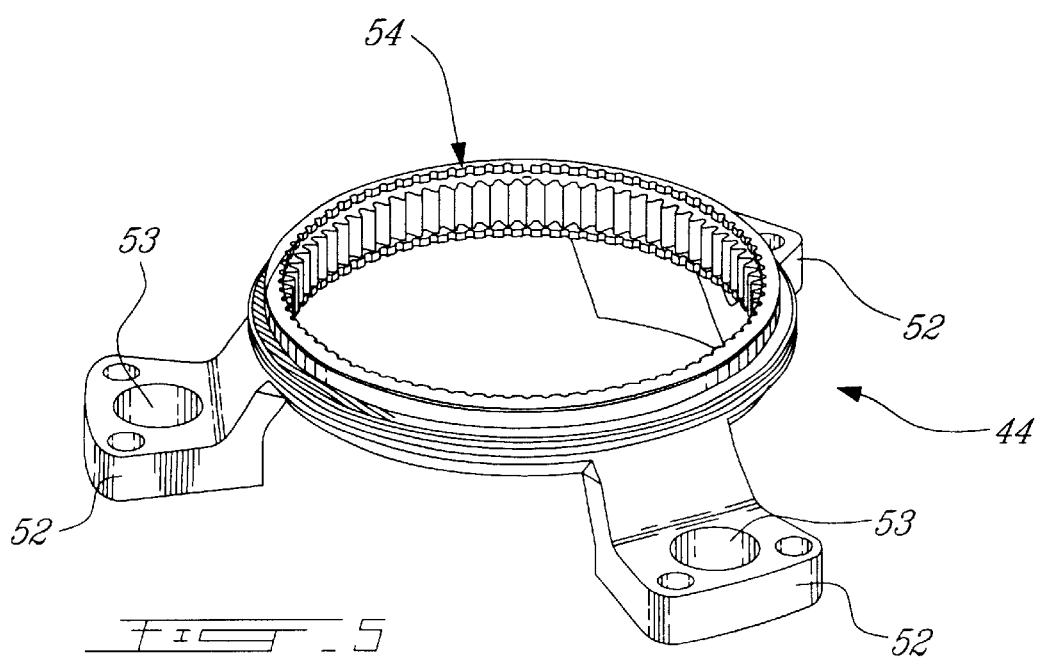
FIG. 5 shows a perspective view of the coupling adapter element of FIG. 3.

Referring now to FIG. 2, the reduction gearbox 12 will now be described in more detail. The first reduction stage 26 receives input from the power plant through power turbine output shaft 34 which drives the first stage sun gear 32. The first stage outer ring gear 36 is held stationary within the gearbox casing, and a plurality of planet gears 38 are supported within ring gear 36 by a torque transfer planetary carrier assembly 40, comprised of a first stage planetary carrier 42 and coupling adapter 44. Each planet gear 38 is rotatably mounted in the planetary carrier 42 about an axis 39, as describe further below, and is in meshing engagement with both the sun gear 32 and the outer ring gear 36. The drive shaft 34, sun gear 32, ring gear 36, and planetary carrier 42 are all concentric about, and both the sun gear 32 and planetary carrier 42 are adapted to rotate about, a central axis 37. Each planet gear 38 has its own individual axis of rotation 39, about which each rotates, and together are thereby adapted to rotate the planetary carrier 42 about the central axis 37 when driven by shaft 34 through sun gear 32.

The coupling adapter 44 is fastened to, and is therefore adapted to rotate with, the first stage carrier 42 and serves to transfer torque to the second reduction stage 28 of the gearbox as described below. The second stage 28 operates substantially the same as the first stage, with modifications apparent to those skilled in the art, and thus will only be described briefly here. The second stage 28 comprises a central second stage sun gear 56 supported within the adapter 44, which is in meshing engagement with a plurality of second stage planet gears 60 which rotate within a stationary second stage outer ring gear 58. The second stage planet gears 60 rotate a second stage planetary carrier 62 which provides output torque to the propeller shaft 29. The second stage sun gear 56 and planetary carrier 62 also rotate about the central axis 37 of the reduction gearbox, and second stage planet gears 60 rotate about their individual axes of rotation 59.

Referring now to FIGS. 3, 4a, 4b, 5 and 6, the torque transfer planetary carrier assembly 40 generally comprises the first stage planetary carrier 42 and the coupling adapter 44. The planet gears 38 are each rotatably mounted in the planetary carrier 42 on axles 41 between planet gear brackets 46 defined in two radially extending carrier plates 48a and 48b, perpendicular to central axis 37 and having axle openings 49 therein. The carrier plates comprise an upstream plate 48a and a downstream plate 48b, preferably integrally joined to one another. The planet gear axle openings 49 and the individual axes of rotation 39 are preferably radially and circumferentially equidistantly spaced about central axis 37. Therefore, in a preferred embodiment having three planet gears 38, the individual axes of rotation 39 are spaced 120° apart around central axis 37.

A plurality of mounting pads 50 extending from the planetary carrier 42 preferably circumferentially intermediate each planet gear individual axis of rotation 39. The mounting pads 50 are axially located intermediate the upstream and downstream plates, 48a and 48b respectively, of the planetary carrier 40, and preferably located at or near the midpoint therebetween. These can be located axially anywhere between the carrier plates to balance the twist occurring between the plates resulting from the deformation of the mounting pads under load. The coupling adapter 44 has an equal number of legs 52 extending therefrom and adapted to correspond to and be mated with the mounting pads 50 of the carrier 42. Mating holes 53 are provided for connection, and the two elements are preferably mounted together using press fit pins 57 and a threaded nut, though other connection means are possible. In the exemplary embodiment, the coupling adapter 44 also comprises a first stage output spline 54 having internal gear teeth 55 adapted to mesh with and transfer torque to another splined component, which in this case, as shown in FIG. 2, is a second stage sun gear 56. In a single stage planetary gearbox, this splined component receiving torque output would be replace with a propeller shaft connection means, as would easily be understood by one skilled in the art. Nominally, twist between plates will be completely removed when the carrier and adapter meet at the midpoint between the two plates, however slight adjustments of the placement may be required to balance local moments created around the pin 57.

In use, drive shaft 34 rotates sun gear 32 to drive planet gears 38. As planet gears 38 rotate within stationary ring gear 36, the planetary carrier 42 is driven via a load transfer through the planet axles 41 to plates 48a and 48b. Pins 57 pass the load from carrier pads 50 to adapter legs 52 to rotatingly drive the coupling adapter 42 at a reduced speed relative to shaft input drive 34. Further speed reduction is achieved through the second reduction stage 28.

The configuration of the link between the carrier and the coupling adapter is such that no substantially relative twist between the upstream and downstream plates 48a and 48b of the planetary carrier occurs. Therefore, no torsional deflection of the planetary carrier occurs, as the torque input is transferred directly to the adapter 44 by the pads on carrier 42. Thus, a differential torsional load across the planet gear axles 41, is avoided. The location of the interface between the carrier 42 and the adapter 44 (i.e. pads 50 and legs 52) intermediate the ends of axles 41 of the planet gears 38 (and preferably approximately midway therebetween), assists in removing differential torque loading across the gear axles, and therefore assists in reducing or eliminating twist in the planetary carrier 42. Improved gear alignment beneficially results.

The embodiment of the invention described above is intended to be exemplary only. For example, in the preferred embodiment three planet gears are used, however another number of planet gears can be used. Additionally, the torque transfer assembly can be applied to a single reduction stage, wherein the coupling adapter could drive the propeller shaft directly. One skilled in the art will appreciate that the present invention also has application well beyond the gas turbine engine example described. The scope of the invention is therefore intended to be limited solely by the scope of the appended claims.

What is claimed is:

1. A torque transfer assembly adapted for use in a planetary gear train, the gear train including a sun gear rotatable about an axially extending central axis, a concentric outer ring gear, and a plurality of planet gears mechanically intermediate said sun gear and said ring gear and in meshing engagement therewith, the plurality of planet gears adapted for receiving torque input from the sun gear, said torque transfer assembly comprising:

a planetary carrier rotatable about said axially extending central axis and adapted to rotatably support said plurality of planet gears on a plurality of axles between first and second axle ends, said first and second axle ends defining first and second planes respectively, said plurality of axles being parallel to the central axis and the first and second planes being perpendicular to the central axis, the planet gears being circumferentially located on the planetary carrier about the central axis, the carrier having a first connecting member extending therefrom; and a torque transfer coupling adapter disposed concentrically with said planetary carrier and rotatable therewith, said torque transfer coupling adapter having a central torque output element and a second connecting member extending therefrom, said second connecting member adapted to be engaged with said first connecting member to structurally join the coupling adapter and the planetary carrier, said first and second connecting members being structurally joined together between said first and second planes.

2. The torque transfer device as defined in claim 1, wherein said torque transfer coupling adapter is removably engaged with said planetary carrier.

3. The torque transfer device as defined in claim 1, wherein the first and second connecting members engage one another at approximately a midpoint between the first and second planes.

4. The torque transfer device as defined in claim 1, wherein the torque transfer coupling adapter and the planetary carrier are engaged together only at the first and second connecting members.

5. The torque transfer device as defined in claim 1, wherein the first connecting member comprises a plurality of first connecting elements and wherein the second connecting member comprises an equal number of second connecting elements.

6. The torque transfer device as defined in claim 5, wherein the second connecting elements are leg elements extending from the central torque output element of the torque transfer coupling adapter, and wherein the first connecting elements comprise a plurality of mounting locations adapted to receive the leg elements.

7. The torque transfer device as defined in claim 6, wherein the leg elements are disposed intermediately between said planet gears.

8. The torque transfer device as defined in claim 1, wherein said central torque output element of said torque transfer coupling adapter comprises gear teeth adapted for meshed engagement with a driven output.

9. The torque transfer device as defined in claim 8, wherein said driven output is a propeller shaft.

10. The torque transfer device as defined in claim 8, wherein said driven output is an input spline for a subsequent stage of said planetary gear train.

11. The torque transfer device as defined in claim 2, wherein said torque transfer coupling adapter and said planetary carrier are engaged by fasteners.

12. The torque transfer device as defined in claim 11, wherein said fasteners are radially disposed outwardly of individual axis of rotation of said plurality of planet gears.

13. The torque transfer device as defined in claim 1, wherein said first and second connecting members are integral.

14. The torque transfer device as defined in claim 1, wherein said planetary carrier comprises axially spaced apart upstream and downstream plates supporting said plurality of axles therebetween, said upstream and downstream plates respectively defining third and fourth planes substantially perpendicular to said central axis, and said first and second connecting members being structurally joined together between said third and fourth planes.

* * * * *

UNITED STATES PATENT AND TRADEMARK OFFICE
CERTIFICATE OF CORRECTION

PATENT NO. : 6,663,530 B2
DATED : December 16, 2003
INVENTOR(S) : Martin Poulin, Alain Lewis and Robert Gautier It is certified that error appears in the above-identified patent and that said Letters Patent is hereby corrected as shown below:

<u>Title page,</u>
Item [54], Title, delete "ZERO TWIST CARRIER" and insert -- REDUCED TWIST EPICYCLIC GEAR CARRIER --

Signed and Sealed this

Eighteenth Day of May, 2004

JON W. DUDAS
*Acting Director of the United States Patent and Trademark Office*